United States Patent Office 3,558,648
Patented Jan. 26, 1971

3,558,648
1-(2-AMINOPHENYL)ISOINDOLIN-3-ONES
Goetz E. Hardtmann, Florham Park, and Hans Ott, Convent Station, N.J., assignors to Sandoz-Wander, Inc., a corporation of Delaware
No Drawing. Application Jan. 3, 1966, Ser. No. 521,239, now Patent No. 3,475,449, dated Oct. 28, 1969, which is a continuation-in-part of application Ser. No. 463,378, June 11, 1965. Divided and this application July 2, 1969, Ser. No. 857,250
Int. Cl. C07d 27/50
U.S. Cl. 260—325                7 Claims

ABSTRACT OF THE DISCLOSURE

Disclosed are isoindolo[2,1 - d][1,4]benzodiazepin - 6-(7H)-ones pharmaceutically active and useful as sedatives, sedative/hypnotics, tranquilizers, anticonvulsants and antidepressants. Also disclosed are various processes and intermediates including the compounds which are 1-(2-aminophenyl)isoindolines, 1-(2-aminophenyl)isoindoline-3-ones, 2'-aminobenzophenone-2-carboxylic acids, 2-(2-aminobenzoimidoyl)benzamides and 5 - methylmorphanthridin-6(5H)-ones.

This is a divisional application of copending application Ser. No. 521,239, filed Jan. 3, 1966, now U.S. Patent No. 3,475,449, which in turn is a continuation-in-part of application Ser. No. 463,378, filed June 11, 1965, now U.S. Patent No. 3,375,246.

The subject invention is directed primarily to alternative processes for the preparation of therapeutically active and pharmaceutically acceptable isoindolobenzodiazepinones, particularly those of the formula

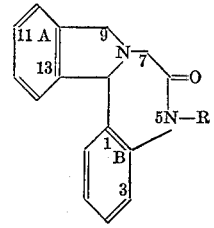

wherein one or both of rings A and B are either unsubstituted or substituted with one or more substituents, such as a chlorine atom (—Cl), a fluorine atom (—F) and a bromine atom (—Br), in any of the available positions, but preferably at least one of the positions 2-, 11- and 12; and R is either methyl or ethyl, and to intermediates in said preparation.

Since compounds I have an asymmetric carbon atom $C_{13b}$, said compounds exist as racemates, and as optically active enantiomers. This invention includes the racemates, the enantiomers and the method of producing the enantiomers.

The object of this invention is to improve the procedure for obtaining compounds I and their optically active enantiomers. In accomplishing this object, a number of new compounds have been obtained as intermediates. Some of these intermediates, e.g. XI, XV and XVI, also have pharmacological activity.

A schematic diagram of the steps leading to the preparation of racemic compounds I and enantiomers thereof is presented in columns 2 and 3. Although said diagram illustrates the preparation of a preferred embodiment I', the procedures are equally applicable to the preparation of all compounds I.

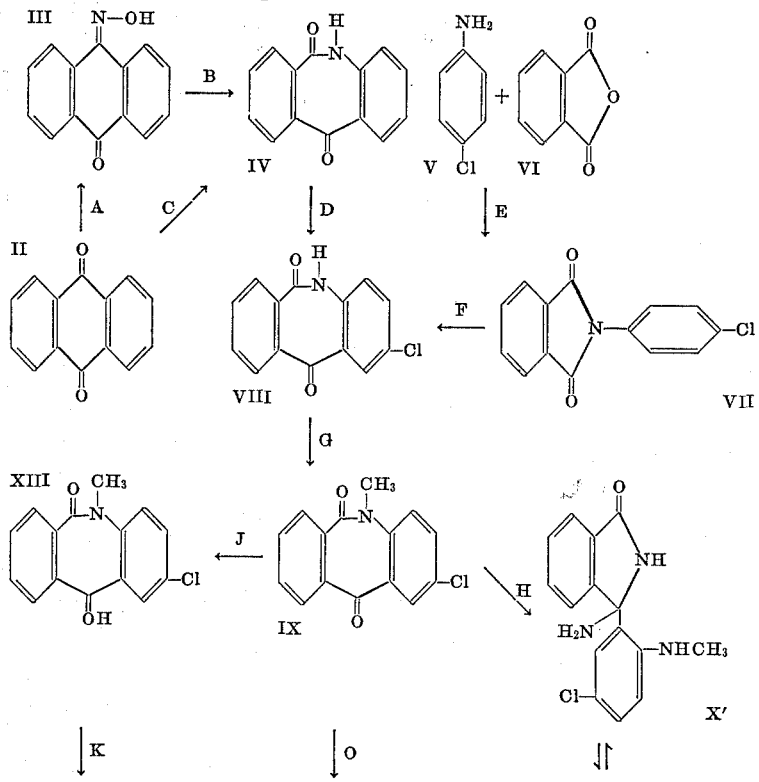

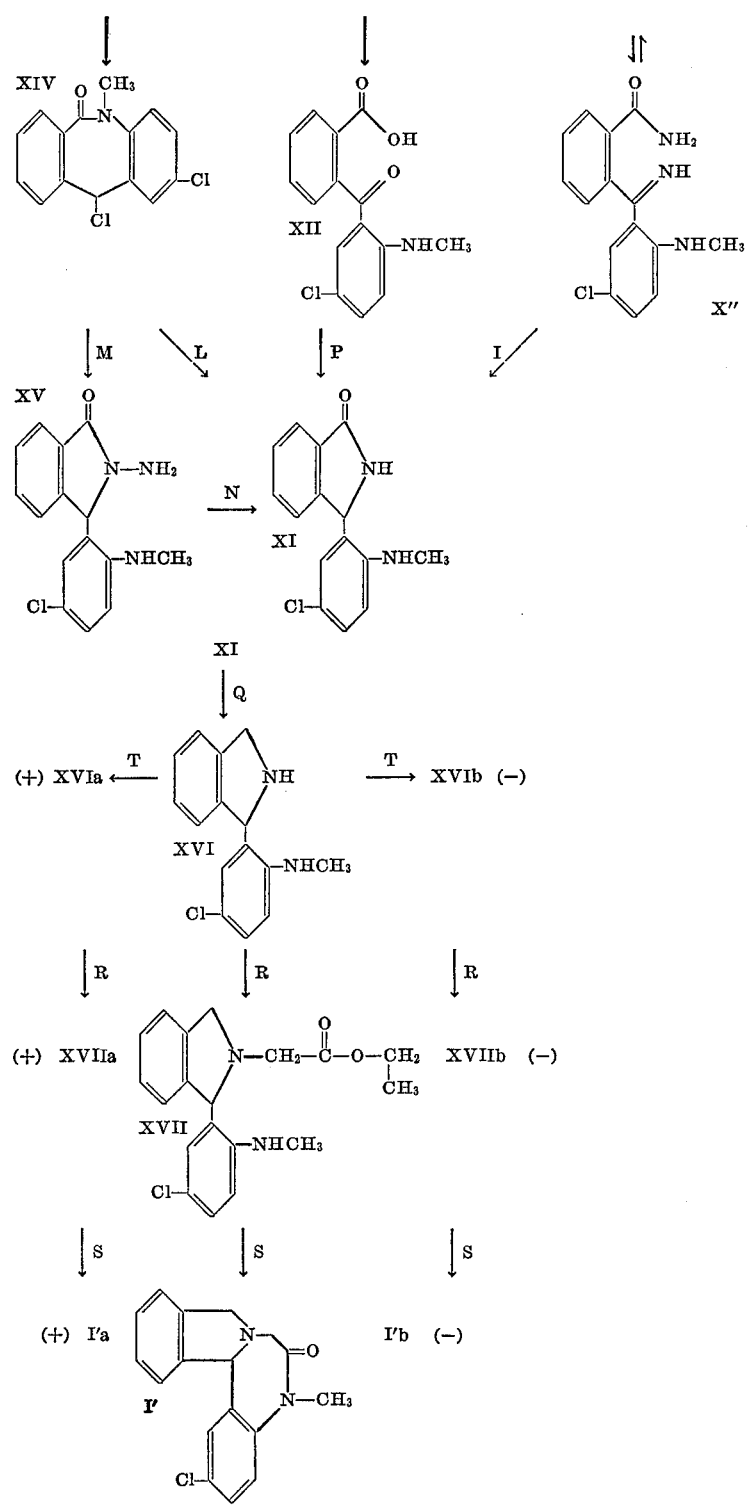

Anthraquinones II (with or without contemplated substituents on the benzene rings) are known or are readily prepared according to well-established procedures. The reactions leading from II to III to IV and from II directly to IV are also well-known and are not of the essence with respect to the instant invention except insofar as they demonstrate how to obtain those compounds IV which may hitherto have been unknown.

Reaction A is effected with hydroxylamine in ethanol under pressure to produce the corresponding oxime III which, in turn, is converted (reaction B) to the corresponding morphanthridine-6,11(5H)-dione IV by Beckmann Rearrangement. Alternatively, compound IV is prepared directly from the corresponding anthraquinone II by the Schmidt Reaction C.

If it is desired to introduce a chlorine atom into the 2-position of compound IV (corresponding to the 2-position of compound I), compound IV (unsubstituted in the 2 position) is dissolved either in glacial acetic acid or dimethylacetamide (DMA), and chlorine is introduced (reaction D) into the resulting solution to which iodine has been added. Only 5 parts by volume of DMA are required per part by weight of compound IV at 100° C., whereas four times that volume of glacial acetic acid are needed at the same reaction temperature.

The reaction can be effected at room temperature (20° C.) with relatively more solvent or with boiling solvent.

Approximately three moles of chlorine per mole of IV are introduced into the solution when reaction D is conducted at 100° C.; less is required at lower temperatures. Towards the end of the reaction the product precipitates. If, after precipitation of compound VII, too much additional chlorine is introduced, a dichlorinated product is formed. Especially at lower temperatures, anhydrous potassium acetate may be added to remove hydrochloric acid formed during the course of the reaction.

Compound VII is formed (with or without the indicated chlorine atom) by melting together (reaction E) corresponding compounds VI and V.

Reaction F is effected by admixing compound VII with a melt of anhydrous aluminum chloride and pulverized sodium chloride and heating the resultant at a temperature from 310° to 312° C. for about one hour. The procedure is a variation from that described in German Pat. No. 551,256 of May 28, 1932. Materially increased yields are obtained when anhydrous aluminum chloride is added to compound VII before the latter is introduced into the melt. Fluorine-containing compounds (VIII) are preferably prepared by route E, F.

The reaction time can be varied between 30 minutes and 2 hours, but little variation is permissible with respect to the temperature.

Reaction G is effected by adding a methanolic solution of sodium methoxide and then, after evaporation of some solvent, adding methyl iodide to a solution of compound VIII (or IV). Suitable solvents for compound VIII are anhydrous dimethylformamide, dimethylacetamide, dioxane and (under slightly different conditions) toluene. The solution of sodium methoxide in methanol is, alternatively, replaced by crystalline sodium methoxide, sodium hydride or sodium amide. The reaction with methyl iodide takes from ½ to 24 hours. The reaction is over when the resulting mixture is approximately neutral. The reaction is conducted at temperatures from room temperature to about 50° C.

Compound IX (or one of its counterparts) is a key intermediate, as is the corresponding compound XI. Although there are a number of ways for preparing compound XI from the corresponding compound IX, the preferred procedure includes reactions H and I.

Reaction H is effected with sodium in anhydrous liquid ammonia (sodium amide being formed) in a pressure container at a temperature in the range of from 80° to 160° C. At least about 3 parts by volume of anhydrous liquid ammonia should be employed per part by weight of compound IX. At least one part by weight of sodium should be used per 45 parts by weight of compound IX when the reaction is carried out at from 110° to 120° C. The sodium may be replaced by an equivalent amount of either sodium hydride, sodium amide or the corresponding derivatives of other alkali metals. The reaction time is at least four hours at a temperature from 110° to 120° C.

The product (compound X) of reaction H exists as tautomers X' and X".

Reaction I is, e.g., a sodium borohydride reduction. Although the preferred solvent is ethanol (containing at most 15 percent by volume of water), either methanol, propanol, methylene chloride/methanol, dioxane/water, glyme or diglyme/water can alternatively be used. Theoretically, only a molar equivalent of sodium borohydride is required, but an excess is indicated. The reaction time varies from 1 to 10 hours at temperatures from 25° to 100° C.

Reaction J is also a reduction with, e.g., sodium borohydride. In lieu of the preferred 95% ethanol, either methanol, dioxane, glyme or glyme containing up to 15 percent by volume of water is employed as the solvent. Moreover, a solvent system additionally containing such cosolvents as benzene, toluene and diethylether may be used. The volume of solvent is sufficient to produce a clear solution of compound IX. At least one equivalent of sodium borohydride is required but an excess is indicated. The reaction can be effected in as little as 10 minutes under reflux conditions, but longer durations, e.g. overnight (about 17 hours), are required at room temperatures.

Reaction K may be accomplished with, e.g., thionyl chloride under reflux conditions. A considerable excess of thionyl chloride is indicated. Alternative procedures, such as (1) thionyl chloride in an organic solvent like benzene or toluene at reflux for several hours and (2) phosphorus tri- or pentachloride in either chloroform or methylene chloride at a temperature between 20° to 60° C. produce the same compound XIV.

Compound XIV is autoclaved (reaction L) in anhydrous liquid ammonia for from 5 to 25 hours at a temperature from 65° to 150° C. to obtain the corresponding compound XI.

Reaction M is effected with anhydrous hydrazine under reflux conditions.

Reaction N is effected by adding sodium nitrite to an acid suspension of compound XV.

Reaction O is a saponification of an amide with 2 N (aq.) sodium hydroxide (or alkali hydroxide solution of other concentrations) of compound IX, followed by neutralization with aqueous hydrochloric acid. Since compounds IX are insoluble in aqueous media, the saponification is complete as soon as a clear solution in sodium hydroxide is formed. Lower temperatures can be employed, and co-solvents such as tetrahydrofurane, dioxane and lower alcohols may be used.

Ring closure P is effected according to the procedure of Dutch Patent No. 20,363 of October 1964. An ethanolic solution of compound XII is saturated with ammonia prior to hydrogenation for from 3 to 60 hours with Raney-Nickel catalyst at a temperature from about 90° to about 150° C. and a pressure of about 2200 p.s.i.g. From 4 to 40 parts by volume of absolute ethanol are used per part by weight of compound XII. From 1 to 6 parts by weight of Raney-Nickel catalyst are employed per 12 parts by weight of compound XII.

Reaction Q is an electrolytic reduction.

Reaction R is effected in an ethanolic solution (as least 100 parts by volume of ethanol per 15 parts by weight of compound XVI) with a tertiary amine, e.g. triethylamine, and either ethyl bromo- or chloroacetate under reflux. At least one equivalent of tertiary amine and from one to 4 equivalents of haloacetate are used per one equivalent of compound XVI. Either methanol or benzene can replace the ethanol.

Ring closure S is effected in boiling glacial acetic acid (at least 100 parts by volume per 15 parts by weight of compound XVI used for reaction R).

Compounds I and their pharmaceutically acceptable acid addition salts are useful as sedatives, sedative/hypnotics, tranquilizers, anticonvulsants and antidepressants. They are administered either orally or parenterally in standard dosage forms, e.g. tablets and capsules, in daily doses of from 30 to 200 milligrams.

Each of the pharmaceutically active compounds of this invention may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tableting techniques, which are well-known in the art, employing the necessary amounts of conventional granulating liquids, e.g. alcohol SD-30 and purified water. An exemplary tableting formulation for the instant active compounds is:

| | Parts |
|---|---|
| Title compound of Example 15 | 50 |
| Tragacanth | 2 |
| Lactose | 39.5 |
| Corn starch | 5 |
| Talcum | 3 |
| Magnesium stearate | 0.5 |
| Alcohol SD–30, Purified water, q.s. | |

The following examples illustrate the invention, all temperatures being in degrees centigrade, parts and percentages being by weight unless otherwise specified and the relationship between parts by weight and parts by volume being the same as that between the kilogram and the liter.

EXAMPLE 1

2-chloromorphanthridine-6,11(5H)-dione

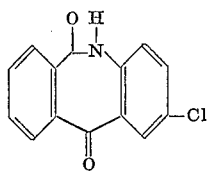

Dissolve 100 parts of morphanthridine-6,11(5H)-dione in 2000 parts by volume of hot glacial acetic acid. Add to the obtained solution a few iodine crystals and then introduce chlorine gas thereinto until the thus-produced reaction solution (maintained at 100°) becomes porridge-like from precipitated reaction product. Cool the resultant to room temperature. Filter off the crystals; wash them with water, ethanol and diethylether; and dry them at 100° in vacuo to obtain the title compound, melting point (M.P.) 295° to 298°.

EXAMPLE 2

2-chloromorphanthridine-6,11(5H)-dione

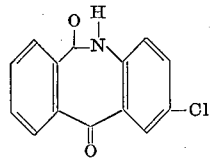

Mix 16 parts of anhydrous aluminum chloride and 4 parts of pulverized sodium chloride, and heat the obtained mixture to 305°. Add to the thus-obtained melt (over a period of 5 minutes) a mixture of 4 parts of N-p-chlorophenylphthalimide (prepared by melting together p-chloroaniline and phthalic anhydride) and 4 parts of anhydrous aluminum chloride. Heat the resultant for one hour at 310° to 312°, cool, add thereto 125 parts of ice, shake the thus-obtained mixture and filter off the produced precipitate. Dry the precipitate prior to dissolving it in chloroform. Extract the obtained chloroform solution with sodium carbonate (aq.) solution and then with water. Dry the resulting chloroform phase over sodium sulfate; admix the dried chloroform phase with charcoal; filter off the charcoal; and evaporate the filtrate until crystallization of the title compound, M.P. 291° to 294°, starts.

EXAMPLE 3

2-chloro-5-methylmorphantridine-6,11(5H)-dione

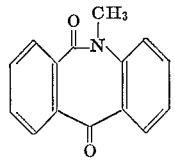

Dissolve 50 parts of 2-chloromorphanthridine-6,11(5H)-dione (title compound of Example 1) in 500 parts by volume of anhydrous dimethylformamide (DMF). Add to the thus-obtained solution a solution of 5.5 parts of sodium dissolved in 50 parts by volume of methanol. From the resultant distill the solvent mixture off in vacuo until the volume is approximately 125 parts (by volume).

At approximately 40° add to the obtained concentrate 75 parts of methyl iodide and shake the resultant for several hours. Dilute the obtained material with 800 parts by volume of water, stir for one hour and then filter off precipitated crystals. Wash the crystals with water; dry the washed crystals: dissolve the dried crystals in a minimal volume of boiling ethanol; cool the thus-obtained ethanolic solution to room temperature and filter off the precipitated crystals of the title compound, M.P. 140° to 142°. Recrystallize several times from ethanol to obtain title compound, M.P. 148° to 151°.

Replacing the methyl iodide with an equivalent of dimethylsulfate results in the preparation, in similar manner, of the title compound. Replacing the methyl iodide with an equivalent of ethyl iodide results in the preparation, in similar manner, of 2-chloro-5-ethylmorphanthridine-6,11(5H)-dione, M.P. 135° to 137°.

EXAMPLE 4

1-amino-1-(5-chloro-2-methylaminophenyl)isoindolin-3-one

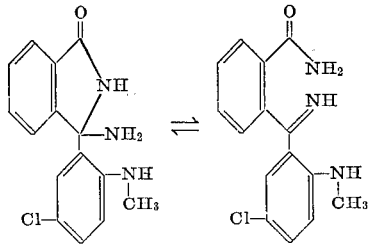

Dissolve 22 parts of 2-chloro-5-methylmorphanthridine-6,11(5H)-dione (title compound of Example 3) in 150 parts by volume of anhydrous liquid ammonia. Add to the thus-obtained solution a solution of 1.5 parts of sodium in 10 parts by volume of anhydrous liquid ammonia, and heat the resulting mixture in a pressure tube for 16 hours at 110° to 120°. Cool the thus-produced reaction mixture to room temperature, and evaporate ammonia therefrom. (Dissolve the obtained crystalline residue in 250 parts by volume of 95% ethanol to prepare one of the starting materials for Example 5.)

Dissolve the obtained crystalline residue in chloroform, water-wash the obtained chloroform solution (2 or 3 washings), dry the thus-washed solution and evaporate the chloroform therefrom in vacuo. Recrystallize the obtained residue from diethylether to obtain the title compound as white crystals which start to decompose at 45°.

Replacing the 2-chloro-5-methylmorphanthridine-6,11(5H)-dione with an equivalent of 5-methylmorphanthridine-6,11(5H)-dione results in the preparation, in similar manner, of 1-amino-1-(2-methylaminophenyl)isoindolin-3-one.

EXAMPLE 5

1-(5-chloro-2-methylaminophenyl)isoindolin-3-one

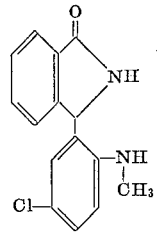

Add a solution of 10 parts of sodium borohydride to 250 parts by volume of the ethanolic solution (see Example 4) of 1-amino-1-(5-chloro-2-methylaminophenyl)isoindolin-3-one, and reflux the resulting mixture for four hours. Cool the thus-refluxed material to room temperature, and destroy any excessive sodium borohydride by adding 2 N hydrochloric acid slowly to said material. Thereafter, evaporate the ethanol therefrom and admix 2 N sodium hydroxide (aq.) solution with the residue until the pH thereof is in the range of from 8 to 9.

Add ethylacetate to the resultant to facilitate crystallization. Filter off formed precipitate. Extract aqueous phase of filtrate 3 times with 200 parts (each) by volume of ethylacetate. Wash the combined organic phase with saturated (aq.) sodium chloride solution, dry the washed organic phase and then concentrate same to 100 parts by volume. Collect the precipitated crystals, combine same with previously-obtained precipitate and recrystallize from chloroform/ethanol to obtain title compound, M.P. 227° to 229°.

Replacing the title compound of Example 4 with an equivalent of 1-amino-1-(2-methylaminophenyl)isoindolin-3-one results in the preparation, in similar manner, of 1-(2-methylaminophenyl)isoindolin-3-one, M.P. 194° to 196°, the hydrochloride of which has a melting point of from 215° to 217°.

EXAMPLE 6

2-chloro-11-hydroxy-5-methylmorphanthridin-6(5H)-one

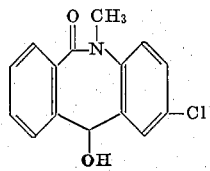

Dissolve 10 parts of 2-chloro-5-methylmorphanthridine-6,11(5H)-dione (title compound of Example 3) in 150 parts by volume of 95% ethanol; add some chloroform thereto to clarify the obtained solution and heat the resultant clarified solution with 3.5 parts of sodium borohydride at 60° (with stirring) for 20 minutes.

Thereafter cool the thus-treated material to room temperature, and add acid (preferably acetic acid) thereto in small portions until a clear solution results. Concentrate the thus-obtained clear solution to half its volume. Add 2 N sodium hydroxide (aq.) solution to the resulting concentrate until it is slightly alkaline; then add water thereto to precipitate the reaction product. Collect the precipitate, water-wash and dry to obtain title compound, M.P. 195° to 198°.

Extraction can alternatively be employed, but precipitation is faster and is preferred.

EXAMPLE 7

2,11-dichloro-5-methylmorphanthridin-6(5H)-one

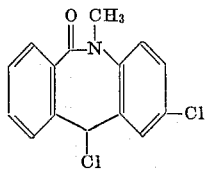

Dissolve 8.5 parts of 2-chloro-11-hydroxy-5-methyl-morphanthridin-6(5H)-one (title compound of Example 6) in 120 parts by volume of thionyl chloride. Reflux the obtained solution for 3 hours. Then evaporate excess thionyl chloride (add 60 parts by volume of benzene to the refluxed material and evaporate the resultant to dryness; add 60 parts by volume of benzene to the residue and evaporate the resultant to dryness to remove all thionyl chloride) from the refluxed material. When all of the thionyl chloride has been removed, crystallize the residue from methylene chloride to obtain the title compound, M.P. 188° to 190°.

For removal of the excess thionyl chloride other inert solvents, such as chloroform and toluene, can be used in place of benzene.

EXAMPLE 8

1-(5-chloro-2-methylaminophenyl)isoindolin-3-one

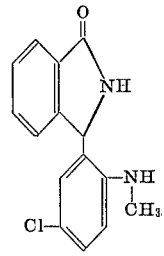

Dissolve 5 parts of 2,11 - dichloro - 5 - methylmorphanthridin-6(5H)-one (title compound of Example 7) in 100 parts by volume of dry liquid ammonia, and heat the resulting solution for 16 hours at 100° in an autoclave. Evaporate the ammonia from the autoclaved material, dissolve the resulting residue in 100 parts by volume of hot chloroform (containing some ethanol), wash the obtained solution with water, dry the washed solution over sodium sulfate and then concentrate the dried material to 10 parts by volume of solvent. Crystallize, filter off crystals and recrystallize from chloroform/ethanol to obtain title compound, M.P. 225° to 227°.

EXAMPLE 9

2-amino-1-(50-chloro-2-methylaminophenyl)-isoindolin-3-one

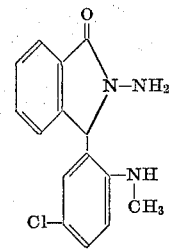

Reflux 5.8 parts of 2,11 - dichloro - 5 - methylmorphanthridin-6-one (title compound of Example 7) with 60 parts by volume of anhydrous hydrazine for one hour. Pour the refluxed material into water, extract the resultant with methylene chloride, wash the organic phase first with water and then with saturated (aq.) sodium chloride solution and then dry the thus-washed organic phase over sodium sulfate before evaporating same in vacuo. Crystallize the thus-produced oily residue with diethylether, and filter off the title compound; recrystallize from methylene chloride/diethylether to obtain title compound, M.P. 62° to 64°. (The title compound crystallizes with 1 mole of diethylether as crystal solvent.)

EXAMPLE 10

1-(5-chloro-2-methylaminophenyl)isoindolin-3-one

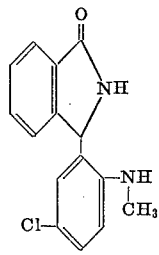

Suspend 0.36 part of 2 - amino-1-(5-chloro-2-methylaminophenyl)isoindolin - 3-one (title compound of Example 9) in 3.5 parts by volume of 1 N (aq.) hydrochloric acid. Cool the obtained suspension in an ice-bath, and add to said cooled suspension (under stirring and further cooling) 0.09 part of sodium nitrite in 2 parts by volume of water. Filter off formed precipitate and wash same with water. Recrystallize the washed precipitate to obtain title compound, M.P. 225° to 227°.

EXAMPLE 11

5'-chloro-2'-methylaminobenzophenone-
2-carboxylic acid

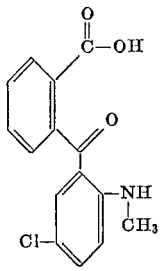

Mix 20 parts of 2 - chloro-5-methylmorphanthridine-6,11(5H)-dione (title compound of Example 3) with 175 parts by volume of 2 N (aq.) sodium hydroxide solution and heat the resultant for 50 minutes on a steam-bath. Cool the resulting clear solution to room temperature to precipitate the sodium salt of the title compound.

Add to the precipitate 150 parts by volume of water and then (under stirring) 150 parts by volume of 2 N (aq.) hydrochloric acid. Filter and water-wash the fine crystals which are thus formed. Dry the washed crystals and re-crystallize same from chloroform/methanol to obtain title compound, M.P. 226° to 230°.

EXAMPLE 12

1-(chloro-2-methylaminophenyl)-isoindolin-3-one

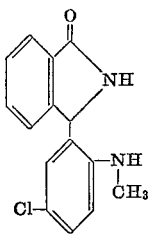

Mix 12 parts of 5'-chloro-2-methyl aminobenzophenone-2-carboxylic acid (title compound of Example 11) with 70 parts by volume of absolute ethanol. Saturate the obtained mixture (under cooling) with ammonia before adding thereto 3 parts of Raney-Nickel and hydrogenating for several hours at 110° to 130° under 2200 p.s.i.g. pressure. Cool the hydrogenated material to room temperature, evaporate solvent therefrom and crystallize the resulting residue from chloroform to obtain title compound, M.P. 225° to 227°.

EXAMPLE 13

1-(5-chloro-2-methylaminophenyl)isoindoline

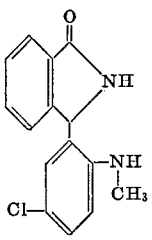

Dissolve 20 parts of 1 - (5 - chloro - 2 - methylaminophenyl)isoindolin-3-one (title compound of Example 5) in 200 parts by volume of 1/1 water/concentrated sulfuric acid. Cool the obtained solution to room temperature and add thereto 200 parts by volume of water. Place the thus-diluted solution in a beaker which is equipped with a lead sheet electrode (200 square units surface). Submerge a porous cup (filled with sulfuric acid of the same concentration and equipped with a lead sheet electrode of the same surface) into said diluted solution, and connect the first electrode to the negative terminal and the second electrode to the positive terminal of a heavy duty 12-volt battery. Stir the solution in the cathode chamber intensively and lectrolyze for 15 hours at from 10° to 25°.

Thereafter, remove the porous cup, and neutralize the sulfuric acid in the beaker with 50% (aq.) sodium hydroxide solution (under cooling). Filter off precipitated crystals to obtain title compound, M.P. 133° to 135°.

Replacing the title compound of Example 5 with an equivalent of 1-(2-methylaminophenyl)isoindolin-3-one results in the preparation, in the same manner, of 1-(2-methylaminophenyl)isoindoline, M.P. 99° to 101°.

EXAMPLE 14

1-(5-chloro-2-methylaminophenyl)isoindolin-
2-acetic acid ethyl ester

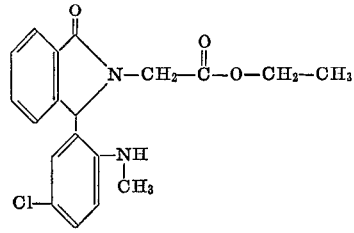

Dissolve 15 parts of 1 - (5 - chloro - 2 - methylaminophenyl)isoindoline (title compound of Example 13), 14 parts of ethyl bromoacetate and 11 parts by volume of triethylamine in 250 parts by volume of absolute ethanol. Reflux the obtained solution for 2 hours. Evaporate the refluxed material to dryness in vacuo. Dissolve the residue in benzene; wash the resulting benzene solution with water; dry the washed benzene solution and then evaporate off the benzene therefrom in vacuo to obtain title compound as residue.

EXAMPLE 15

2-chloro-5-methyl-9,13b-dihydro-5H-isoindolo[2,1-d]
[1,4]benzodiazepin-6(7H)-one

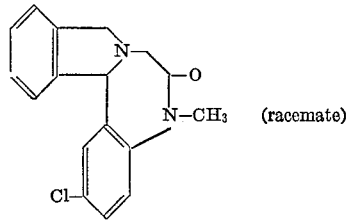

Dissolve the title compound (final residue) of Example 14 in 150 parts by volume of glacial acetic acid. Heat the thus-obtained solution to boiling, and slowly distill therefrom about half of the acid. Then evaporate the remainder to dryness in vacuo. Dissolve the residue in methylene chloride and introduce hydrogen chloride gas into the thus-prepared methylene chloride solution. Add diethylether to this solution to precipitate the hydrochloride, M.P. 263° to 266°, of the title compound. On liberation from the acid addition salt by standard procedures, the free base, M.P. 171° to 173°, is obtained.

Replacing the title compound of Example 14 with an equivalent of 1-(2-methylaminophenyl)isoindolin-2-acetic acid ethyl ester results in the preparation, in similar manner, of 5-methyl-9,13b-dihydro-5H-isoindolo[2,1-d][1,4]-benzodiazepin-6(7H)-one hydrochloride, M.P. 255° to 257.°

EXAMPLE 16

Enantiomers of 1-(5-chloro-2-methylaminophenyl)-
isoindoline

Add 6 parts of D-tartaric acid in 75 parts by volume of ethanol to a solution of 10.3 parts of (±)-1-(5-chloro-2-methylaminophenyl)isoindoline (title compound of Example 13) in 120 parts by volume of ethanol and 60 parts by volume of methylene chloride. Concentrate the resulting mixture to crystalize out the tartrate of the (+)-base, the tartrate of the (—) base remaining in solution. Filter off the thus-crystallized precipitate and free the base therefrom by distributing said precipitate between methylene chloride and dilute aqueous sodium hydroxide solution. Dry the organic phase, and then evaporate the methylene chloride from same in vacuo. Crystallize the residual crude base from methylene chloride/ethanol to obtain (+)-1-(5-chloro-2-methylaminophenyl)isoindoline, M.P. 100° to 102°, $[\alpha]_{546}^{20}$= +44° (c.=1.5, chloroform).

Evaporate the filtrate of the tartrate of the (+)-base to dryness in vacuo and distribute the residue between methylene chloride and dilute (aq.) sodium hydroxide solution. Dry the organic phase, and evaporate the solvent from same in vacuo. Transfer the thus-obtained residue, consisting primarily of the (—)-base, (in the same manner as described above) to the crystalline L-tartrate by addition thereto of L-tartaric acid. The free base (—)-1-(5-chloro-2-methylaminophenyl)isoindoline, M.P. 100° to 101°, $[\alpha]_{546}^{20}$=—43.6° (c.=1.5, chloroform), is thus prepared from the tartrate in the same way as described above for the free (+)-base.

EXAMPLE 17

Enantiomers of 1-(5-chloro-2-methylaminophenyl) isoindolin-2-acetic acid ethyl ester Reflux 3 parts of (+)-1-(5-chloro-2-methylaminophenyl)isoindoline, 2 parts of ethyl bromoacetate and 2 parts of triethylamine in 75 parts by volume of ethanol for 2 hours. Evaporate the thus-refluxed material to dryness. Dissolve the obtained residue in benzene. Wash the benzene (organic) phase sequentially with water, 2 N (aq.) sodium hydroxide solution, 1 N (aq.) hydrochloric acid and with saturated (aq.) sodium chloride solution. Then evaporate the thus-washed organic phase to dryness in vacuo to obtain (+)-1-(5-chloro-2-methylaminophenyl)isoindolin-2-acetic acid ethyl ester as residue.

Replacing the (+)-1-(5-chloro-2-methylaminophenyl)-isoindoline with an equivalent of (—)-1-(5-chloro-2-methylaminophenyl)isoindoline results in the preparation in similar manner, of (—)-1-(5-chloro-2-methylaminophenyl)isoindolin-2-acetic acid ethyl ester.

EXAMPLE 18

(—)-2-chloro-5-methyl-9,13b-dihydro-5H-isoindolo [2,1-d][1,4]benzodiazepin-6(7H)-one Dissolve the (+)-1-(5-chloro-2-methylaminophenyl)-isoindolin-2-acetic acid ethyl ester residue from Example 17 in 30 parts by volume of glacial acetic acid. Boil the thus-obtained solution for 2 hours while some of the acetic acid distills off. Then evaporate therefrom all remaining acetic acid. Dissolve the thus-obtained residue in methylene chloride, and wash the organic phase with dilute (aq.) sodium hydroxide solution and with water. Evaporate the thus-washed organic (methylene chloride) phase to dryness and crystallize the residue from diethyl-ether. Filter off crystals of the title compound, M.P. 173° to 175°, $[\alpha]_{546}^{20}$=—207° (c=0.5, ethanol).

Replacing the (+)-1-(5-chloro-2-methylaminophenyl)-isoindolin-2-acetic acid ethyl ester with an equivalent of the (—)-1-(5-chloro-2-methylaminophenyl)isoindolin-2-acetic acid ethyl ester results in the preparation, in similar manner, of (+)-2-chloro-5-methyl-9,13b-dihydro-5H-isoindolo[2,1 - d][1,4]benzodiazepin - 6(7H) - one, $[\alpha]_{546}^{20}$=+210° (c=0.5, ethanol).

The invention is readily understood from the foregoing description. Various changes may be made in procedures and in the intermediates without departing from the spirit and scope of the invention or sacrificing its material advantages. The examples presented herein are merely illustrative embodiments.

What is claimed is:

1. A compound of the formula

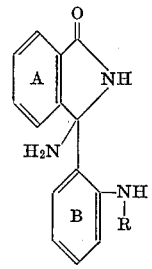

wherein
each of rings A and B is, independently, a member selected from the group consisting of an unsubstituted benzene ring and a benzene ring substituted by at least one halogen selected from the group consisting of a chlorine atom, a fluorine atom and a bromine atom; and
R is a member selected from the group consisting of methyl and ethyl.

2. The compound according to claim 1 which is 1-amino - 1 - (5-chloro-2-methylaminophenyl)isoindolin-3-one.

3. The compound according to claim 1 which is 1-amino - 1 - (2-methylaminophenyl)isoindolin-3-one.

4. A compound of the formula

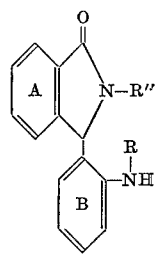

wherein
each of rings A and B is, independently, a member selected from the group consisting of an unsubstituted benzene ring and a benzene ring substituted by at least one halogen selected from the group consisting of a chlorine atom, a fluorine atom and a bromine atom;
R is a member selected from the group consisting of methyl and ethyl; and
R″ is a member selected from the group consisting of a hydrogen atom and —NH₂.

5. The compound according to claim 4 which is 1-(5-chloro-2-methylaminophenyl)isoindolin-3-one.

6. The compound according to claim 4 which is 1-(2-methylaminophenyl)isoindolin-3-one.

7. The compound according to claim 4 which is 2-amino-1-(5-chloro-2-methylaminophenyl)isoindolin - 3 - one.

No references cited.

NICHOLAS S. RIZZO, Primary Examiner

J. A. NARCAVAGE, Assistant Examiner